(12) United States Patent
Burke

(10) Patent No.: US 11,980,320 B1
(45) Date of Patent: May 14, 2024

(54) LID HOLDER

(71) Applicant: John Burke, Sylvania, GA (US)

(72) Inventor: John Burke, Sylvania, GA (US)

( * ) Notice: Subject to any disclaimer, the term of this patent is extended or adjusted under 35 U.S.C. 154(b) by 0 days.

(21) Appl. No.: 18/213,795

(22) Filed: Jun. 23, 2023

(51) Int. Cl.
*A47J 36/12* (2006.01)
*A47J 47/16* (2006.01)

(52) U.S. Cl.
CPC ............... *A47J 36/12* (2013.01); *A47J 47/16* (2013.01)

(58) Field of Classification Search
CPC .................................. A47J 36/12; A47J 47/16
USPC ......................................................... 220/744
See application file for complete search history.

(56) References Cited

U.S. PATENT DOCUMENTS

| | | | | |
|---|---|---|---|---|
| 1,722,394 A | * | 7/1929 | Potts | A47J 36/10 222/467 |
| 1,928,995 A | * | 10/1933 | De Biasi | A47J 36/12 248/213.2 |
| 2,934,210 A | | 4/1960 | Jordan | |
| 2,972,414 A | | 2/1961 | Sipe | |
| 4,279,357 A | * | 7/1981 | Robinson | B65F 1/1615 220/744 |
| 4,741,262 A | * | 5/1988 | Moncrief | A47J 36/22 294/154 |
| 4,915,433 A | * | 4/1990 | Schafer | A47J 36/12 294/12 |
| 5,683,010 A | | 11/1997 | Boyajian | |
| 6,012,593 A | | 1/2000 | Knittel | |
| D476,847 S | | 7/2003 | Kingsley | |
| 6,997,329 B2 | | 2/2006 | Ohanian | |
| 8,479,926 B1 | | 7/2013 | Blaisdell | |
| 8,833,569 B2 | | 9/2014 | Clarkson | |
| 10,188,240 B2 | | 1/2019 | Clarke | |
| 10,905,279 B2 | | 2/2021 | Groll | |
| D961,337 S | * | 8/2022 | Lee | D7/601 |
| D988,811 S | * | 6/2023 | Hartley | D7/601 |
| 2016/0374506 A1 | | 12/2016 | Bui | |
| 2019/0110637 A1 | * | 4/2019 | Groll | A47J 36/12 |

FOREIGN PATENT DOCUMENTS

| | | | | |
|---|---|---|---|---|
| DE | 10247961 A1 | * | 10/2003 | ............. A47J 36/12 |
| JP | 2011161183 A | * | 8/2011 | |
| JP | 2017086142 A | * | 5/2017 | |

* cited by examiner

*Primary Examiner* — J. Gregory Pickett
*Assistant Examiner* — Niki M Eloshway
(74) *Attorney, Agent, or Firm* — Kenneth Buffington

(57) ABSTRACT

A lid holder is a device for temporarily holding cooking pot container lids for cooking pots while cooking. The lid holder prevents lid condensate from dripping on the countertop without the need for a drip pan. The lid holder is simple, inexpensive, and easy to construct. The lid holder is formed from a continuous solid rod or wire with only four bends and a single connection point. The lid holder is shaped into an inverted U-shaped loop structure with a top section and a base section. The lid rests on the top section and the bottom section rests on the countertop. The loop is closed and joined together at a connection point by a weld or solder joint.

11 Claims, 6 Drawing Sheets

LID HOLDER

FIELD OF THE INVENTION

The present invention generally relates to a device for temporarily holding cooking pot container lids for cooking pots while cooking.

BACKGROUND OF THE INVENTION

There are many patents related to cooking pot lid holders. While cooking on a stove it is often necessary to remove the pot lid to inspect and stir the ingredients. When the lid is removed and placed on the countertop, condensation and other liquids drip off the lid. Additionally, a hot lid may damage the countertop. It is desirable to construct a simple device to temporarily store or hold the pot lids above the countertop surface, so the hot lid does not drip or damage the countertop. Several lid holder patents are disclosed in U.S. Pat. No. 2,934,210 to Jordan, U.S. Pat. No. 2,972,414 to Sipe, U.S. Pat. No. 5,683,010 to Boyajian, U.S. Pat. No. 6,997,329 B2 to Ohanian, U.S. Pat. No. 6,012,593 to Knittel, U.S. Pat. No. 8,479,926 B1 to Blaisdell, U.S. Pat. No. 10,905,279 B2 to Groll, U.S. Patent 20160374506A1 to Bui, U.S. Pat. No. D476847S to Kingsley, U.S. Pat. No. 8,833,569B2 to Clarkson, and U.S. Pat. No. 10,188,240 B2 to Clarke. However, all the above disclosures are complex and more difficult to construct than the instant invention. Also, no drip pan is required with the instant invention.

SUMMARY OF THE INVENTION

An object of the present invention is to provide an improved lid holder that is simple, inexpensive, and easy to construct. The lid holder is formed from a continuous rod or wire with only four bends and a single connection point. Another object of the invention is to prevent lid condensate or dripping on a countertop. There is no drip pan needed since the inside face of the lid is placed face up on the lid holder. The lid holder is formed as an inverted U-shaped structure designed to sit on a countertop or other smooth surface. The lid holder has a top and bottom section. The lid rests on the top section and the bottom section rests on the countertop. The lid holder is compact and can be moved around and stored with ease.

DESCRIPTION OF THE DRAWINGS

Referring now to the drawings in which like reference numbers represent corresponding parts throughout.

DETAILED DESCRIPTION OF THE INVENTION

Figure 1:
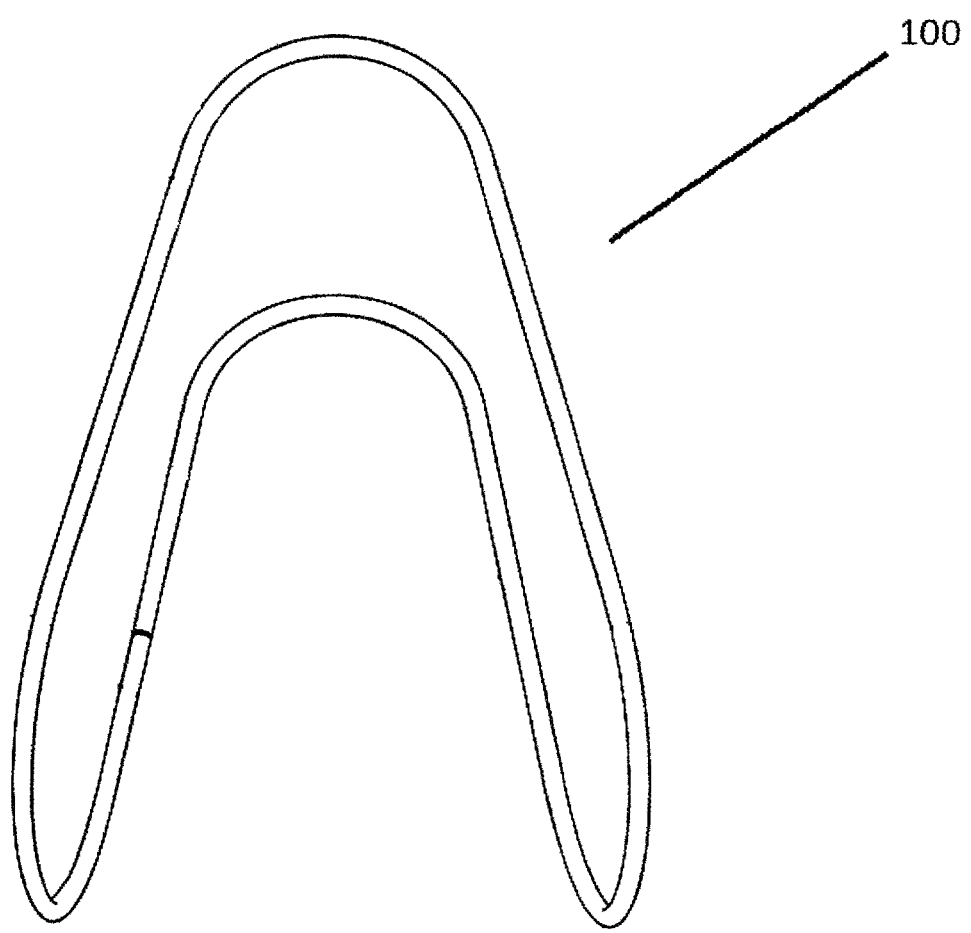
FIG. 1 is a front perspective view of a lid holder according to a preferred embodiment of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Figure 6:
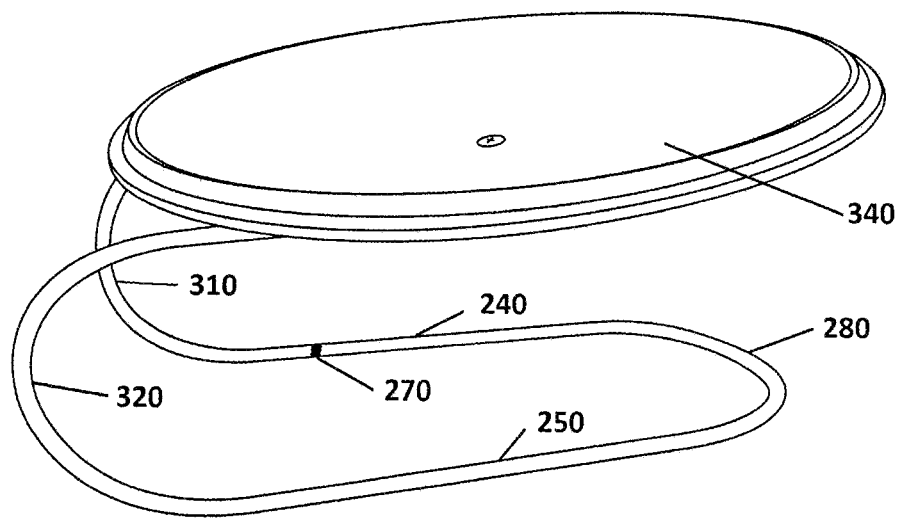
FIG. 6 is a right-side perspective view of a lid holder with a pot lid to illustrate the operation of the lid holder according to a preferred embodiment of the present invention.

Referring now to the drawings, a lid holder 100 is illustrated in FIG. 1. Lid holder 100 is preferably constructed from a continuous bendable metal rod with uniform circumference sufficiently rigid to support a lid 340 (FIG. 6). Preferably, the lid holder 100 is coated with a nonslip substance to prevent unwanted movement of the lid 340 or unwanted movement of the lid holder 100 on the countertop. Overall, the lid holder appears as an inverted U-shaped looped device with a top part and bottom part.

Figure 2:
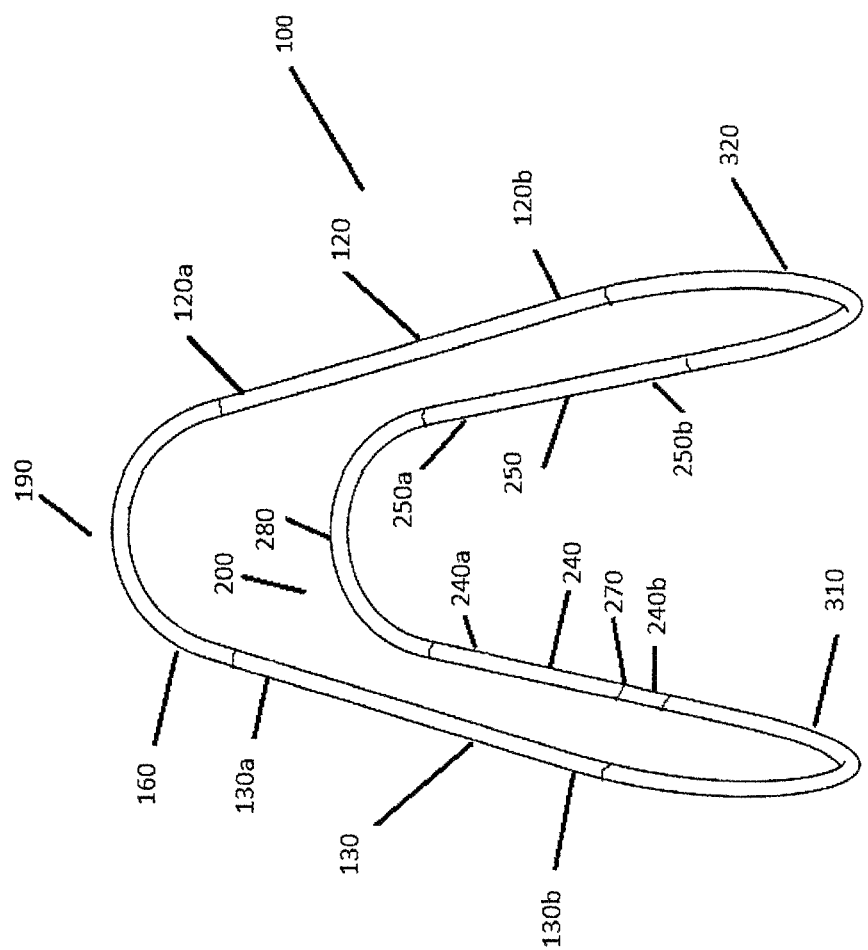
FIG. 2 is a detailed front perspective view of a lid holder according to a preferred embodiment of the present invention.

Referring to FIG. 2, the lid holder 100 shown divided into portions for illustrative purposes only to aid in describing the detailed invention. The lid holder 100 includes a left upper portion 130, a right upper portion 120, a left lower portion 240, and a right lower portion 250. All four portions are substantially linear, and the same length and circumference. Each of the four portions have a proximal end and a distal end.

Additionally, there are two horizontal curved portions. An upper horizontal curved portion 160 on top and a lower horizontal curved portion 280 is on the bottom. Preferably, both horizontal curved portions (160, 280) are of the same length, circumference, and 180-degree radius of curvature. They are identical and mirror images of one another.

There are two vertical curved portions. The left vertical portion 310 and the right vertical curved portion 320. Preferably, both vertical curved portions (310, 320) are of the same length, circumference, and 180-degree radius of curvature. They are also identical and mirror images of one another.

More particularly, the right upper portion 120 distal end 120*a* connects to an upper horizontal curved portion 160. The right upper portion 120 proximal end 120*b* joins to a right vertical curved portion 320 which interconnects the lower right portion 250 proximal end 250*b*.

Continuing in further detail in FIG. 2, the lower right portion 250 distal end 250*a* joins the lower horizontal curved portion 280. The lower left portion 240 distal end 240*a* joins the lower horizontal curved portion 280.

The lower left portion 240 proximal end 240*b* joins the left vertical curved portion 310 which interconnects upper left portion 130 proximal end 130*b*. A connection point 270 on portion 240 closes the lid holder 100 loop. However, the connection point may be located anywhere on the lid holder. The connection point 270 may be made by crimping, brazing, welding, soldering, or other method of joining two ends together.

Finally, the upper left portion 130 proximal end 130*b* joins the left vertical curved portion 310. The upper left portion 130 distal end 130*a* joins the upper horizontal curved portion 160 which interconnects with upper right portion 120 distal end 120*a*.

In another description of the invention as shown in FIG. 2, the lid holder 100 consists of two sections. A top section 190 and a base section 200. The top section 190 may be defined as an interconnection of the upper left portion 130, top curved horizontal portion 160, and right top portion 120. The base section 200 may be defined as the interconnection of lower left 240, lower curved horizontal portion 280, and lower right portion 250. The top section 190 and base section 200 are mirror images of one another. The base section rests on the countertop and the lid rests on top section 190. The two vertical curved portions (310, 320) support the top section 190 holding the pot lid.

The actual dimensions of the lid holder 100 depends on the lid 340 size and weight. For example, the lid holder 100 may be constructed from ¼-inch diameter solid metal rod. The lid holder 100 height may be 4.25 inches, length 12.00 inches, and width 5.25 inches. The radius of curvature for curved portions 160 and 280 may be 1.75 inches, while the radius of curvature for curved portions 310 and 320 may be 1.88 inches.

Figure 3:
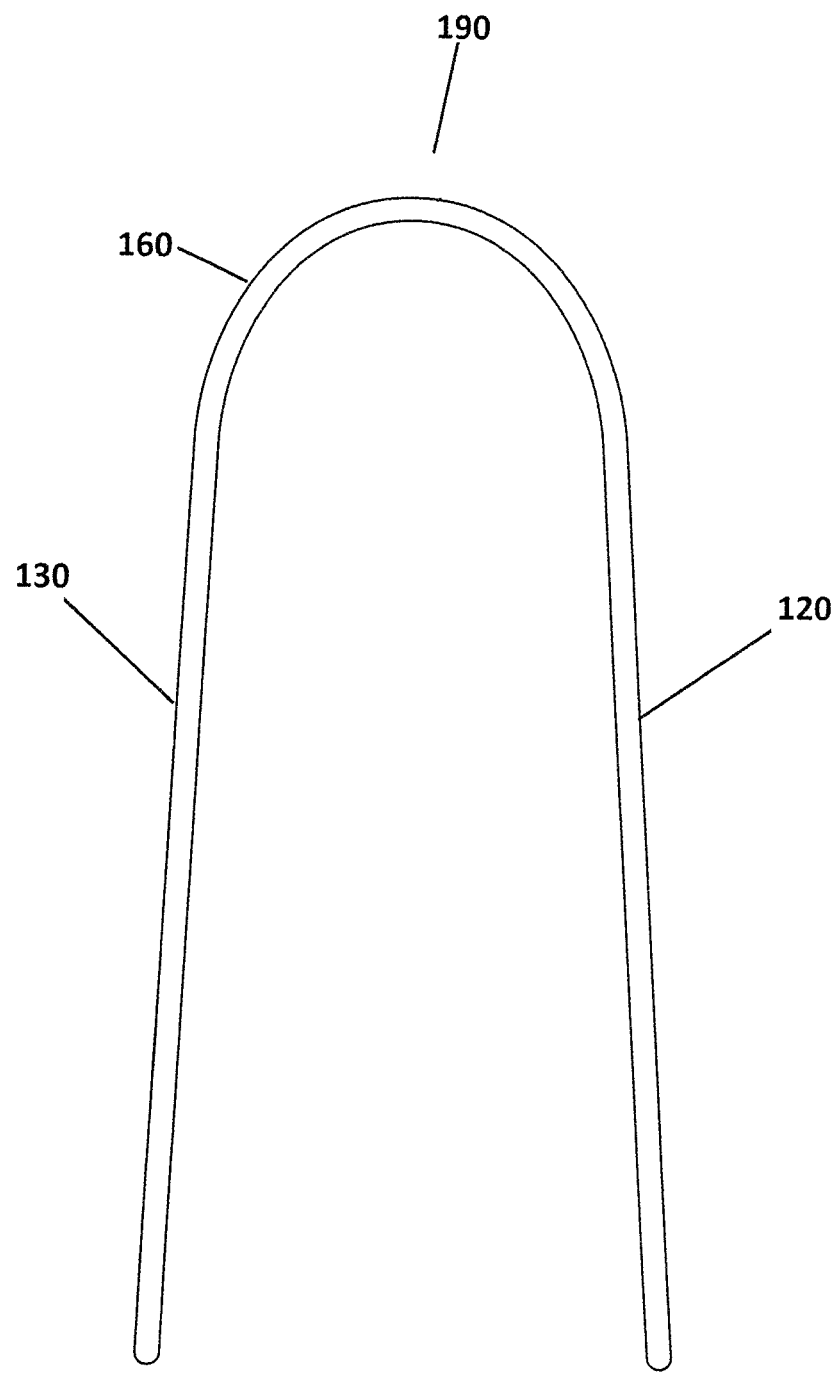
FIG. 3 is a plan view of a lid holder according to a preferred embodiment of the present invention.

FIG. 3 illustrates a plan view of the lid holder 100. Only the top section 190 is shown because it substantially covers or hides base section 200. Top section 190 and base section 200 are mirror images of each other.

Figure 4:
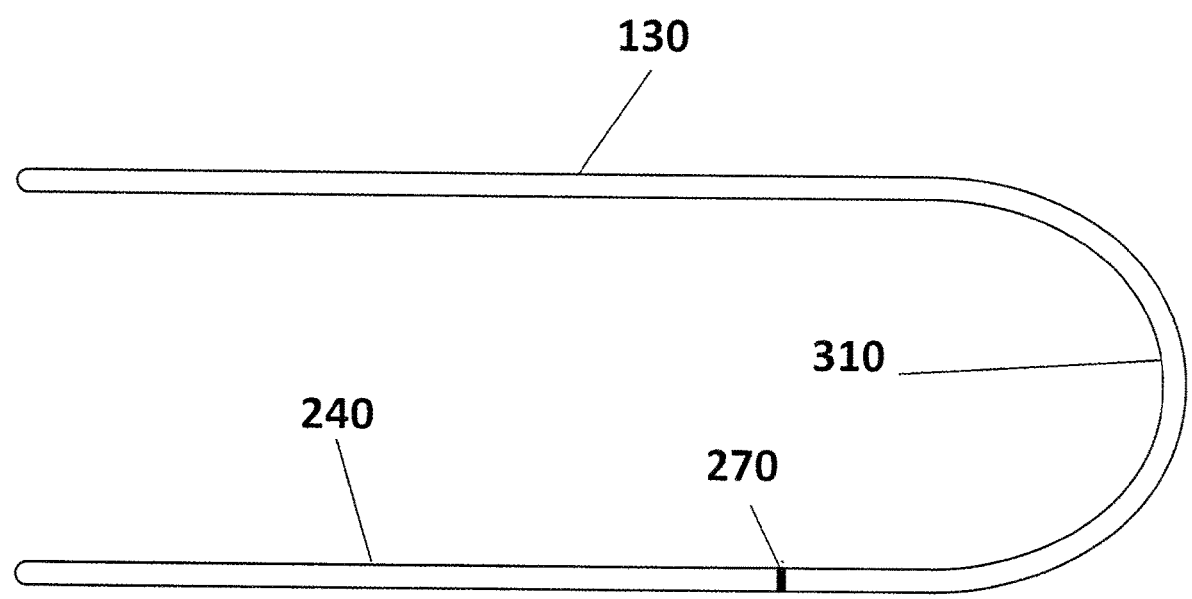
FIG. 4 is a left-side elevation view of a lid holder according to a preferred embodiment of the present invention.

FIG. 4 illustrates a left profile view of the lid holder 100. The top section 190 and base section 200 are shown. The connection point 270 is shown in the base section.

Figure 5:
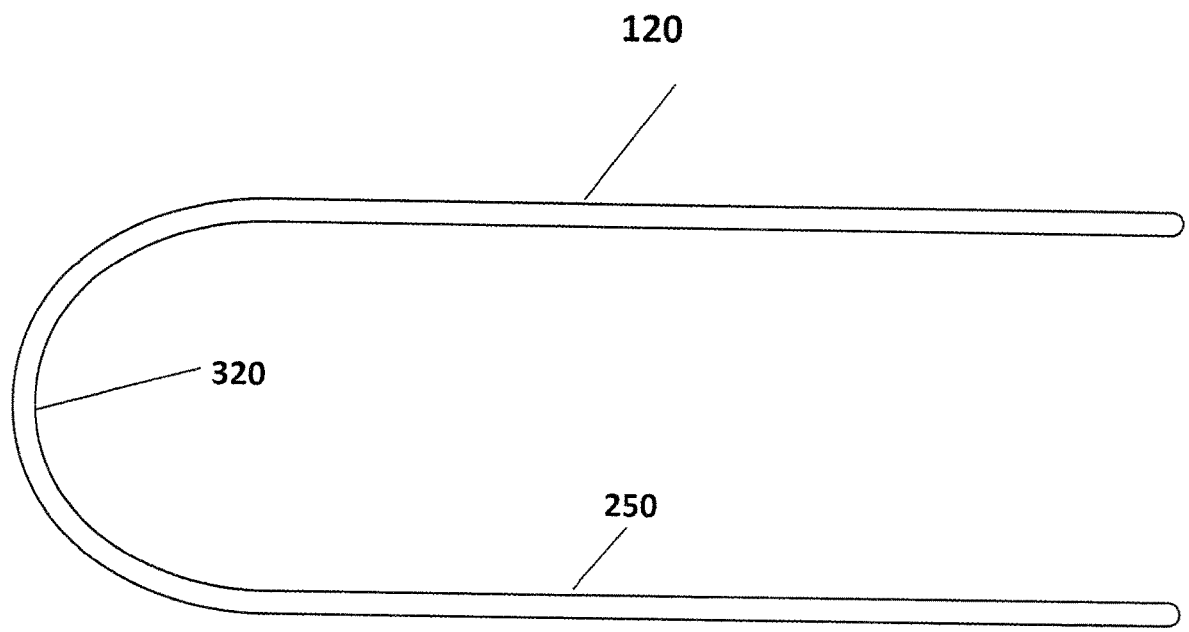
FIG. 5 is a right-side elevation view of a lid holder according to a preferred embodiment of the present invention.

FIG. 5 illustrates a right profile view of the lid holder 100. Except for connection point 270, FIG. 4 and FIG. 5 are mirror images of each other.

FIG. 6 illustrates a side perspective view of the lid holder 100 with a pot lid 340. This illustrates the lid holder in operation. In use, the hot lid 340 is removed from the pot and the inside face of the lid is placed face up on the lid holder 100 so that any condensation or juices remain on the inside face of the pot lid 340 and not drip on the 125 countertop.

The lid holder 100 is preferably formed by bending a continuous length of a metal rod with a single connection point to close the loop. However, there are other variations. The lid holder 100 can be constructed from individual rod or tubing segments that can be separately connected together. Also, right angle bends could be substituted for curved portions. Other suitable materials such as plastic may be substituted for metal. The lid holder may be constructed from heavy gage wire, hollow tubing, or other material that is rigid and bendable. Also, straight right-angle sections may be substituted for curved sections. Instead of an inverted U-shape structure; either the top, base, or both proximal sections may diverge to create a parabolic shaped lid holder.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

I claim:

1. A lid holder device comprising:
    a) a continuous length of a metal rod with four bends in the rod;
    b) a right upper portion with a distal end and proximal end;
    c) a left upper portion with a distal end and proximal end;
    d) a semicircular horizontal upper portion joining the distal ends of the right upper portion on one end and the distal end of left upper portion on the other end;
    e) a right lower portion with a distal end and proximal end;
    f) a left lower portion with a distal end and proximal end;
    g) a semicircular horizontal lower portion joining the distal ends of the right lower portion on one end and the distal end of left lower portion on the other end;
    h) a semicircular left vertical portion joining the proximal end of the left upper portion on one end and the proximal end of the lower left portion on the other end;
    i) a semicircular right vertical portion joining the proximal end of the right upper portion on one end and the proximal end of the left lower portion on the other end;
    j) a right upper portion, right lower portion, left upper portion, and left lower portions each of which are parallel to one another; and
    k) a connection point on the lower left portion, whereby said lid is placed face up between the left upper and right upper portions.

2. The lid holder of claim 1, wherein the right upper portion, right lower portion, left upper, and left lower portions are straight and equal in length.

3. The lid holder of claim 1, wherein the left vertical portion and right vertical portion are mirror images of one another.

4. The lid holder of claim 1, wherein the left vertical portion and right vertical portion each have a 180-degree radius of curvature.

5. The lid holder of claim 1, wherein the upper horizontal portion and lower horizontal portion are mirror images of one another.

6. The lid holder of claim 1, wherein the lid holder is substantially formed as an Inverted U-shaped structure.

7. The lid holder of claim 1, wherein the lid holder is formed from a continuous length of a metal rod with only four bends in the rod.

8. The lid holder of claim 1, wherein the connection point closes the continuous loop.

9. The lid holder of claim 1, wherein the upper horizontal portion and the lower horizontal portion extend outwardly away from the vertical portions.

10. A lid holder constructed from a continuous length of a metal rod for temporarily holding cooking pot lids the lid holder comprising:
    a) a top section with a right upper portion and left upper portion each with a distal end and proximal end, and a smoothly curved horizontal portion joining the distal ends of the right upper portion on one end and the distal end of the left upper portion on the other end;
    b) a base section with a right lower portion and left lower portion each with a distal end and proximal end, and a smoothly curved horizontal lower portion joining the distal ends of the right lower portion on one end and the distal end of the left lower portion on the other end, wherein the top section and base section are mirror images of one another;
    c) a pair of vertical portions joining the top section and base section together, whereby the smoothly curved left vertical portion joins the proximal end of the left upper portion on one end and the proximal end of the left lower portion on the other end, and the smoothly curved right vertical portion joins the proximal end of the right upper portion on one end and the proximal end of the left lower portion on the other end, wherein the pair of smoothly curved vertical portions are mirror images of one another;

d) a right upper portion, right lower portion, left upper portion, and left lower portions each of which are straight and equal in length;
e) a upper horizontal portion and the lower horizontal portion each extending outwardly away from the vertical portions; and
f) a connection point to close the lid holder loop, whereby said lid is placed face up between the left upper and right upper portions.

11. The lid holder of claim 10, wherein the left vertical portion and right vertical portion each have a 180-degree radius of curvature.

\* \* \* \* \*